United States Patent
Maughan et al.

[11] Patent Number: 6,059,480
[45] Date of Patent: May 9, 2000

[54] COMPOSITE STUD

[75] Inventors: Garth B. Maughan, Delta, Ohio; Richard F. Brown, Temperence, Mich.

[73] Assignee: Dana Corporation, Toledo, Ohio

[21] Appl. No.: 09/095,542

[22] Filed: Jun. 10, 1998

[51] Int. Cl.$^7$ ...................................................... F16C 11/06
[52] U.S. Cl. ........................... 403/131; 403/122; 403/128
[58] Field of Search .................................... 403/122, 128, 403/129, 130, 131, 361, 383, 359; D12/162; 280/511, 491.5, 491.1

[56] References Cited

U.S. PATENT DOCUMENTS

| | | |
|---|---|---|
| D. 375,065 | 10/1996 | Duvernay et al. ...................... D12/162 |
| 1,594,471 | 8/1926 | Short . |
| 2,862,740 | 12/1958 | Alexander ................................ 403/130 |
| 2,999,709 | 9/1961 | Melton et al. . |
| 3,401,963 | 9/1968 | Wehner . |
| 3,539,234 | 11/1970 | Rapata ................................ 403/122 X |
| 3,965,554 | 6/1976 | Amos . |
| 4,060,331 | 11/1977 | Domer et al. ........................ 280/511 X |
| 4,154,544 | 5/1979 | Gair ..................................... 403/131 X |
| 4,274,268 | 6/1981 | Taig ..................................... 403/131 X |
| 4,513,857 | 4/1985 | Leach . |
| 4,629,352 | 12/1986 | Nemoto ................................... 403/128 |
| 4,889,356 | 12/1989 | Morris . |
| 4,938,496 | 7/1990 | Thomas et al. .......................... 280/511 |
| 4,941,766 | 7/1990 | Carlson . |
| 5,040,817 | 8/1991 | Dunn ....................................... 280/511 |
| 5,072,962 | 12/1991 | Webb ............................... 280/491.1 X |
| 5,544,968 | 8/1996 | Goellner ............................. 403/122 X |
| 5,884,931 | 3/1999 | McCoy ..................................... 280/511 |

*Primary Examiner*—Lynne H. Browne
*Assistant Examiner*—John Cottingham
*Attorney, Agent, or Firm*—Rader, Fishman & Grauer PLLC

[57] ABSTRACT

A composite stud having a shank with a recess at one end receives a stem formed on a ball. The stem and recess have any suitable shape and preferably a shape that prevents rotation of the ball relative to the shank. A further embodiment has a shank with an extension at one end for insertion into a bore in a ball. The extension is deformed to effect a positive connection.

17 Claims, 3 Drawing Sheets

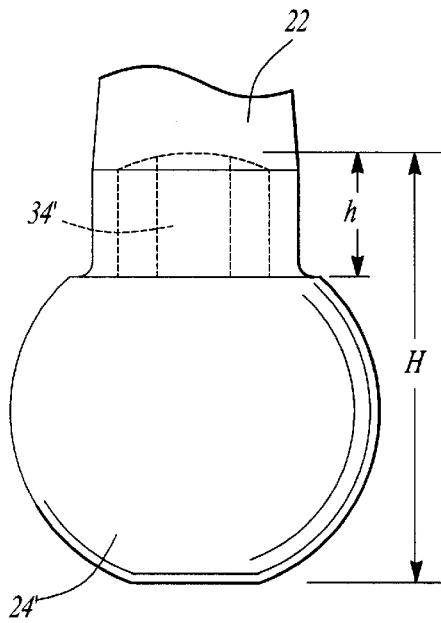
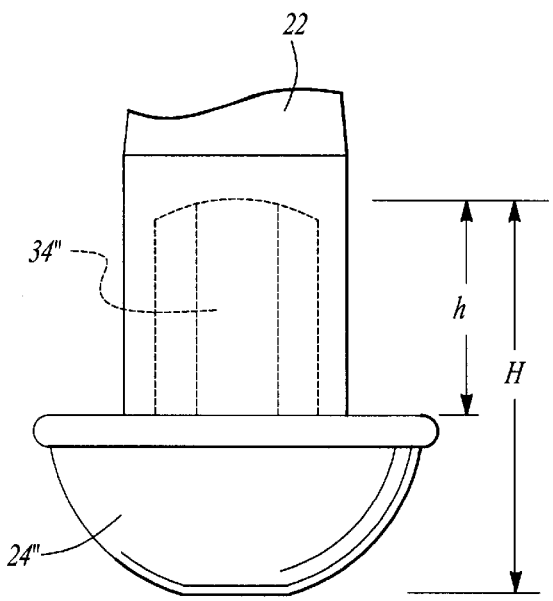
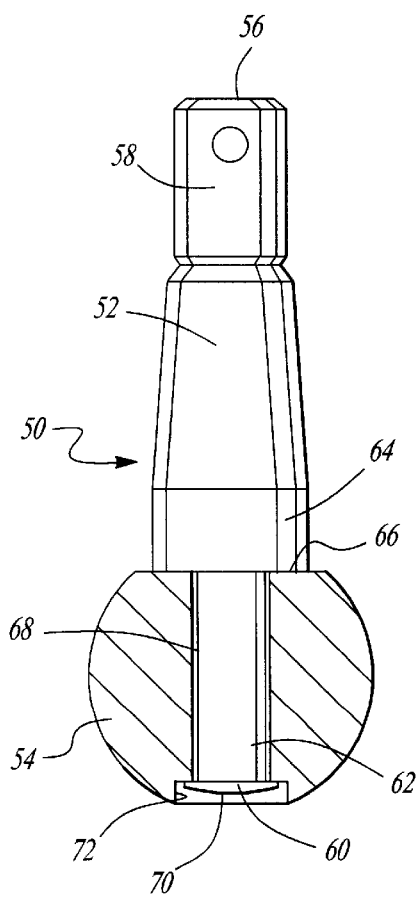
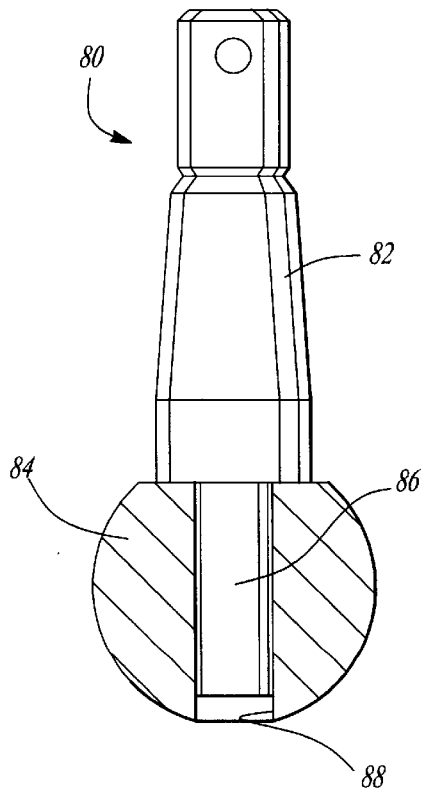

6,059,480

COMPOSITE STUD

FIELD OF THE INVENTION

The present invention relates to a stud for use in a ball and socket assembly and, in particular, to a two-piece composite stud having a shank assembled to a ball.

BACKGROUND OF THE INVENTION

Two-piece studs are known in the prior art. One stud design has a shank with a threaded end for screwing into a threaded bore provided in a ball. Another design has a shank assembled to a ball by inertia or friction welding. Still another design provides a cylindrical pin on a shank that is inserted into a bore in a ball with a set screw tightened in a radial direction to hold the ball on the pin. A further design has a shank with a pin that is received within a pocket in a ball wherein the components are welded together.

However, none of the prior designs have different materials for the shank and the ball. Nor do the prior designs have redundant connections that prevent accidental rotation of the ball relative to the stud.

SUMMARY OF THE INVENTION

The present invention is directed to a composite stud having a shank with first and second ends and a recess formed in the first end, the recess having a predetermined shape. A ball portion includes a stem projecting outwardly from the ball portion with a complementary shape for insertion into the recess to securely connect the shank with the ball portion to form the composite stud.

Possible predetermined shapes of the stem include polygonal, splined, fluted, or serrated geometries. For example, one acceptable predetermined shape is a hexagonal geometry.

Additionally, the stem has a height of at least one quarter of an overall height of the ball portion and can be approximately one third to one half of the overall height. Thus, joint strength is very high and stem tolerances can be readily maintained to ensure full stem insertion with relatively low assembly forces. If the stem is too long, likelihood of interference before full stem insertion is greatly increased. In a preferred embodiment the stem is tapered to provide an interference fit in the recess.

Preferably, the shank is formed from a first material and the ball portion is formed from a second material. The first and second materials can either be the same or different. For instance, the first material wan be steel and the second material can be non-metallic. Alternatively, the first material can be hardened steel while the second material can be unhardened steel.

Another composite stud design according to the present invention has a shank with first and second ends and an extension with a predetermined size and shape. The extension projects generally longitudinally and defines the first end of the shank. A ball portion is formed with a bore having a complementary size and shape for mating engagement with the extension to form the two-piece stud. The bore can be a blind bore or a through bore that preferably includes a counter bore.

In one embodiment, the extension extends a majority of the length of the bore and is mechanically deformed at an outermost end to securely retain the ball portion on the shank. The counter bore facilitates material flow during deformation by staking.

The present invention provides a number of advantages. One advantage of fabricating the stud assembly from two pieces rather than a single piece is the ability to select specific materials for individual components. For example, the shank can be formed from steel and the ball can be formed from a non-metallic material, such as an engineering plastic, that has better bearing characteristics than steel. Moreover, the shank and ball can be fabricated from the same kind of material, but have different hardnesses. For example, in some applications it may be desirable that only the shank is subjected to a heat treatment operation, leaving the ball relatively soft and unhardened. Therefore, a designer is able to customize the stud assembly based on the requirements for a particular application.

A further feature of the present invention permits individual components to have increased production volumes. If a particular ball design is common to a number of different stud assemblies, then the present invention allows the common ball to be manufactured separately in higher volumes than would be possible with one-piece stud assemblies. Similarly, if a particular shank design is common to a number of different stud assemblies, then those shanks can be manufactured in higher volumes. By increasing volumes, manufacturing efficiencies can be obtained, resulting in lower costs.

The present invention also increases reliability by providing a connection having a cross-sectional shape that minimizes the possibility of unwanted rotation. Unlike the prior art, certain embodiments of the present invention have non-circular cross-sections for connecting the shank to the ball. Therefore, if the connection becomes loose, the ball still will not rotate relative to the shank.

BRIEF DESCRIPTION OF THE DRAWINGS

The features and inventive aspects of the present invention will become more apparent upon reading the following detailed description, claims, and drawings, of which the following is a brief description:

FIGS. 8 and 9 show ball configurations for the present invention.

FIG. 10 shows a composite stud according to a second embodiment of the present invention.

FIG. 11 shows a composite stud according to another embodiment of the present invention.

DETAILED DESCRIPTION OF PREFERRED EMBODIMENTS

Figure 1:
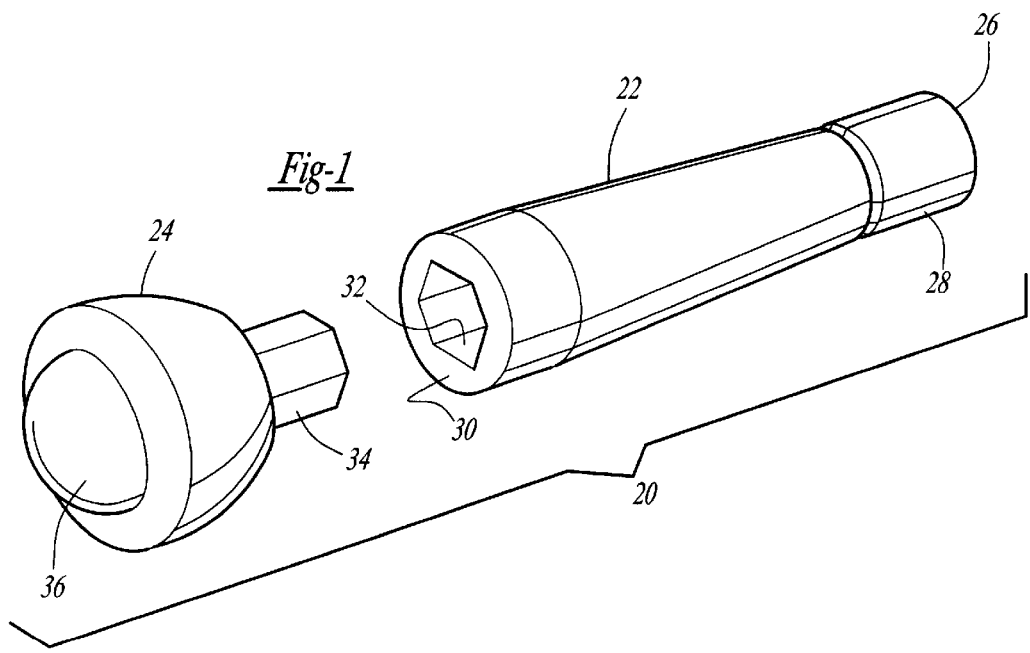
FIG. 1 is an exploded perspective view of a composite stud according to the present invention.

FIG. 1 shows a two-piece composite ball stud assembly 20 having a shank 22 and a ball 24. Shank 22 is a generally elongated member having a first end 26 that includes an attaching portion 28 for attaching to a support (not shown). Shank 22 has a second end 30 that includes a recess 32 having a predetermined shape and a predetermined size. For example, recess 32 can be polygonal, splined, fluted, or serrated. However, any suitable shape or configuration can be used.

Ball 24 includes a stem 34 that projects outwardly and has a complementary shape and size to permit insertion into recess 32 to securely assemble shank 22 with ball 24. Ball 24 further includes a bearing surface 36 for mating engagement with a housing (not shown).

Figure 2:
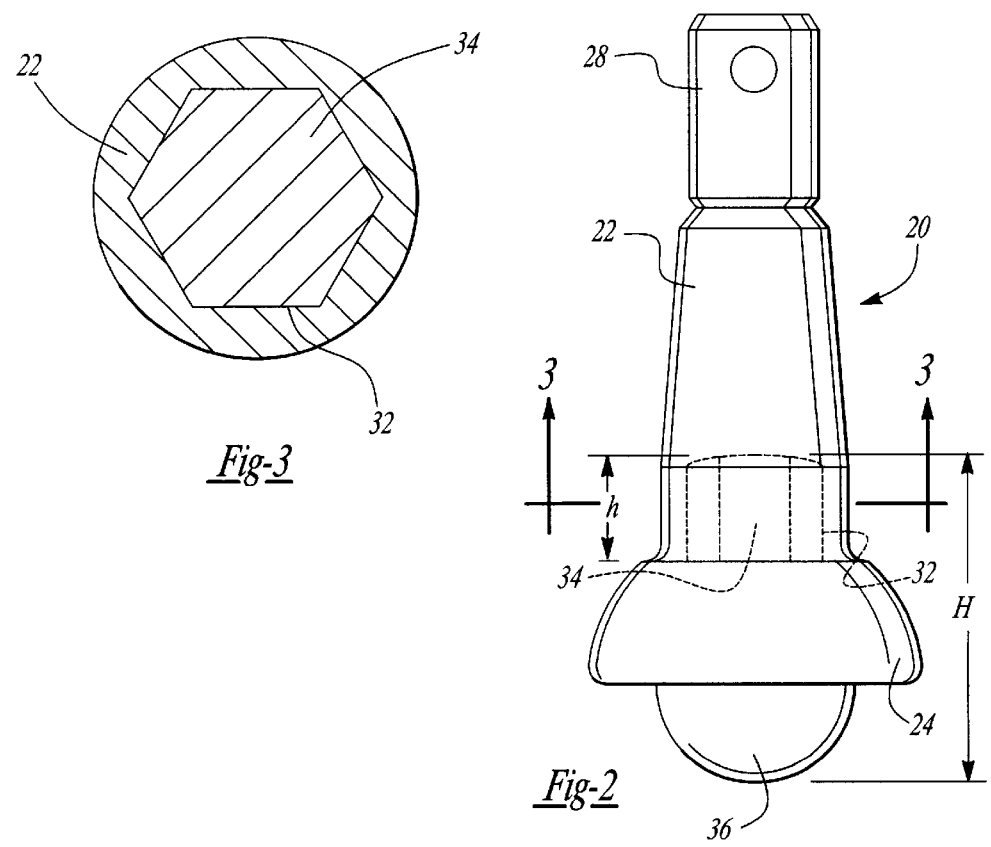
FIG. 2 shows the composite stud of FIG. 1 in an assembled condition.

FIG. 2 shows composite stud assembly 20 securely fastened together by stem 34 being press fit into recess 32. Optionally, if stud assembly 20 is to be used in compression and/or moderate tension loading applications, then shank 22 can additionally be welded to ball 24 at an interface 38. One possible welding method includes resistance welding.

One advantage of fabricating stud assembly 20 from two pieces is the ability to select specific materials for individual components. For example, shank 22 can be formed from steel and ball 24 can be formed from a non-metallic material, such as an engineering plastic, that has better bearing characteristics than steel for many applications. Alternatively, shank 22 and ball 24 can be fabricated from the same kind of material, but have different hardnesses. For example, shank 22 and ball 24 could both be made from steel with only shank 22 being subjected to a heat treatment operation. Thus, shank 22 would be hardened while ball 24 would be relatively soft and unhardened.

A further feature allows increased production volume for either a ball, a shank, or both. If a particular ball design is common to a number of different stud assemblies, then the present invention allows the common ball to be manufactured separately in higher volumes than in one-piece stud assemblies. Similarly, if a particular shank design is common to a number of different stud assemblies, then those shanks can be manufactured in higher volumes separately than in one-piece stud assemblies. By increasing volumes, manufacturing economies can be achieved.

Figure 3:
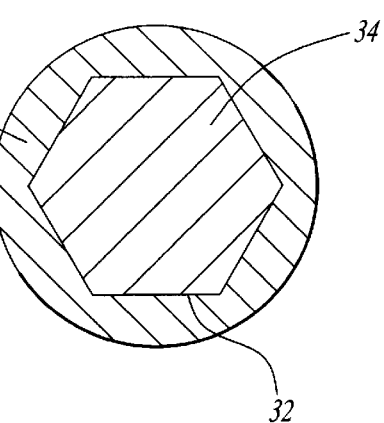
FIG. 3 shows a cross section taken along line 3—3 of FIG. 2.

FIG. 3 is a cross-section taken along line 3—3 of FIG. 2 and illustrates recess 32 and stem 34 having complementary hexagonal shapes. However, any suitable shape can be used. It is preferred to use non-circular cross-sectional shapes to prevent undesirable rotation of ball 24 relative to shank 22 if the connection between the two components becomes loose. Yet, by using a geometry such as the hexagonal shape illustrated in FIG. 3, assembly is facilitated because indexing of ball 24 to align with shank 22 requires less rotation than for example, using a rectangle.

Figure 4:
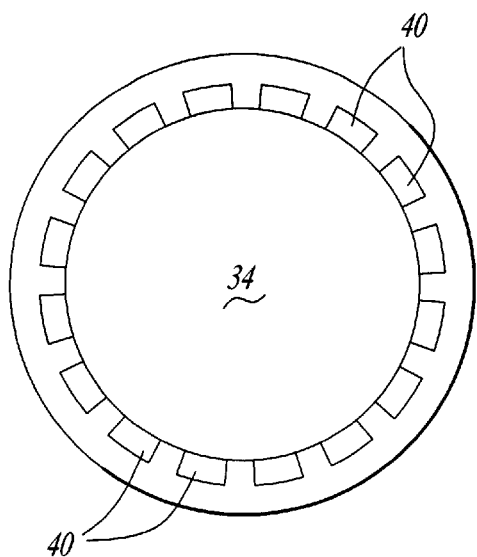
FIGS. 4–7 show specific stem configurations for the present invention.
Figure 5:
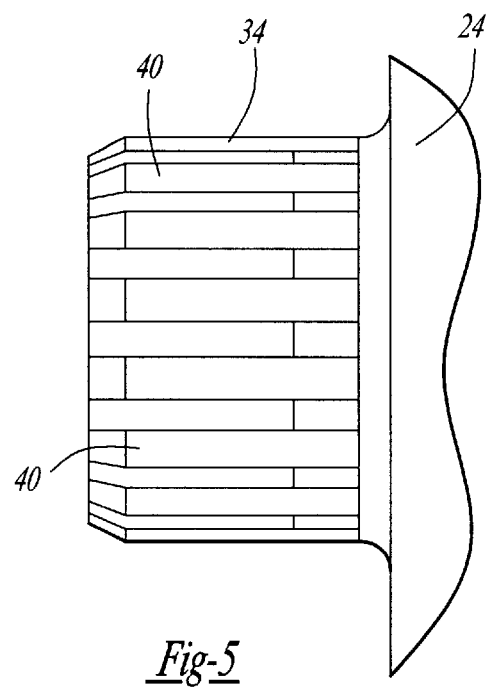
Figure 6:
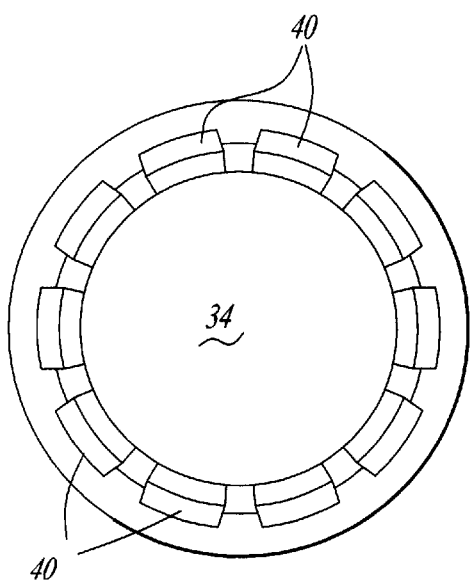
Figure 7:
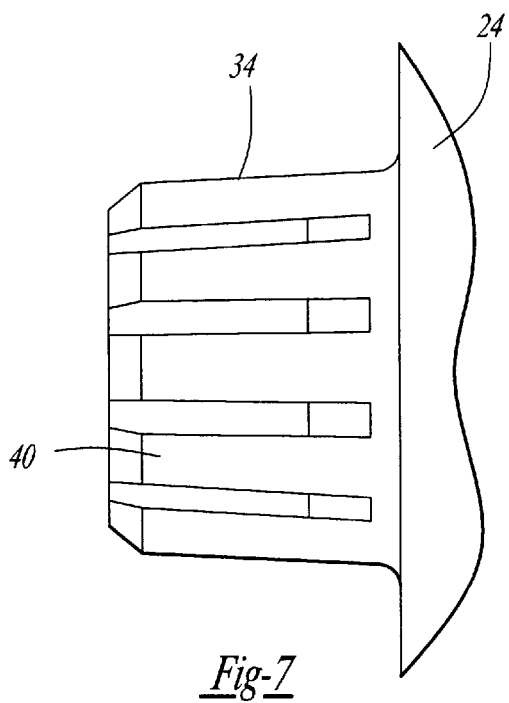

FIGS. 4–7 show specific configurations for stem 34. FIGS. 4 and 5 show a stem 34 having parallel sided splines 40. However, if greater spline surface area is needed for reducing stress, splines 40 could be taper-sided. In addition, stem 34 can have a straight body as shown in FIGS. 4 and 5. Optionally, stem 34 can be tapered to facilitate initial insertion yet still provide a tight, interference fit. Tapered splines also permit greater variations in tolerances and help control depth of insertion. FIGS. 6 and 7 show a tapered stem 34 having splines 40 that are taper-sided.

Further, ball 24 can have any suitable shape or configuration including, but not limited to, spherical, half spherical, or multi-spherical. Also, height h of stem 34, shown in FIG. 2, can vary depending upon the required joint strength. Ball 24 in FIG. 1 has two spherical surfaces and stem 34 has a height that is approximately one third of the overall ball and stem height H. FIG. 8 shows a ball 24' having a nearly full spherical shape and a stem 34' having a height h approximately one quarter of the overall ball and stem height H. FIG. 9 shows a ball 24" with a semi-spherical shape and stem 34" having a height h approximately one half of the overall and stem height H. In addition, shank 22 can have any number of suitable configurations and is not limited solely to those shown in the Figures.

FIG. 10 shows a further embodiment of the present invention having a composite stud assembly 50 with a shank 52 and a ball 54. Shank 52 includes a first end 56 with an attaching portion 58 and a second end 60 that includes an extension 62. Extension 62 has a reduced cross-section relative to an adjacent section 64 of shank 52. Thus, a shoulder 66 is formed where extension 62 meets adjacent section 64. Extension 62 has a predetermined size and a predetermined shape.

Ball 54 has a bore 68 which can be either a blind bore or a through bore. Bore 68 has a size and shape that accommodates extension 62 and provides for secure connection between ball 54 and shank 52, as for example, by a press fit relationship. Preferably, bore 58 is a through bore and extension 62 extends along the majority of bore 68 and is staked at an outermost end 70 to securely retain ball 54 on shank 52 whether or not a press fit condition is otherwise present.

Optionally, but preferably, a counter bore 72 is provided in ball 54 to allow greater material flow of extension 62 when it is deformed during staking. Also, resistance welding can be used to additionally retain ball 54 on extension 62, if compression and/or moderate tension loading applications are anticipated.

Extension 62 is shown having a generally cylindrical shape. However, extension 62 can have any suitable shape including the shapes and configurations described in connection with the first embodiment above. Further, stud assembly 50 can be made from the same materials, different materials, or similar materials that have different hardnesses, as described above regarding the first embodiment.

FIG. 11 shows a composite stud assembly 80 having a shank 82 and a ball 84. An extension 86 is press fit into a bore 88 in ball 84 and extends nearly all of the length of bore 88. Optionally, for compression and/or moderate tension loading applications, resistance welding can be used to additionally retain ball 84 on extension 86.

Preferred embodiments of the present invention have been disclosed. A person of ordinary skill in the art would realize, however, that certain modifications would come within the teachings of this invention. Therefore, the following claims should be studied to determine the true scope and content of the invention.

What is claimed is:

1. A two-piece composite stud comprising:
   a shank having a first end and a second end;
   a blind recess formed in said first end of said shank having a predetermined non-circular shape;
   a ball having at least a partially spherical main body;
   a stem monolithically formed with and projecting outwardly from said ball and having a complementary non-circular shape for mating engagement with said blind recess in said shank; and
   wherein said shank is connected to said ball to form said two-piece composite stud.

2. The composite stud of claim 1, wherein said predetermined shape is one of a polygonal, splined, fluted, or serrated geometry.

3. The composite stud of claim 2, wherein said predetermined shape is hexagonal.

4. The composite stud of claim 1, wherein said stem has a height of at least one quarter of an overall ball and stem height.

5. The composite stud of claim 1, wherein said stem has a height of at least one third of an overall ball and stem height.

6. The composite stud of claim 1, wherein said stem has a height of approximately one half of an overall ball and stem height.

7. The composite stud of claim 1, wherein said stem is tapered for providing an interference fit in said recess.

8. The composite stud of claim 1, wherein said shank is formed from a first material and said ball is formed from a second material.

9. The composite stud of claim 8, wherein said first and second materials are different.

10. The composite stud of claim 9, wherein said first material is steel and said second material is non-metallic.

11. The composite stud of claim 8, wherein said first material is hardened steel and said second material is unhardened steel.

12. The composite stud of claim 1, wherein said main body of said ball is substantially spherical.

13. A composite stud of claim 1, wherein said main body of said ball is generally semispherical.

14. The composite stud of claim 1, wherein said main body of said ball is multi-spherical.

15. The composite stud of claim 2, wherein said stem is generally tapered and includes tapered sided splines.

16. The composite stud of claim 2, wherein said stem includes parallel sided splines.

17. A two-piece composite stud comprising:

a shank having a first end and a second end;

a blind recess formed in said first end of said shank having a predetermined non-circular shape;

a ball having at least a semi-spherical outer periphery;

a stem projecting outwardly from said outer periphery of said ball and having a complementary non-circular shape for press-fit engagement with said blind recess in said shank; and wherein said shank is connected to said ball to form said two-piece composite stud.

* * * * *